(12) United States Patent
Kroeger-Lui

(10) Patent No.: US 10,845,585 B2
(45) Date of Patent: Nov. 24, 2020

(54) INFRARED MICROSCOPE

(71) Applicant: Bruker Optik GmbH, Ettlingen (DE)

(72) Inventor: Niels Kroeger-Lui, Kaiserslautern (DE)

(73) Assignee: Bruker Optik GmbH, Ettlingen (DE)

( * ) Notice: Subject to any disclaimer, the term of this patent is extended or adjusted under 35 U.S.C. 154(b) by 0 days.

(21) Appl. No.: 16/197,230

(22) Filed: Nov. 20, 2018

(65) Prior Publication Data

US 2019/0155011 A1 May 23, 2019

(51) Int. Cl.
| | |
|---|---|
| *G02B 21/00* | (2006.01) |
| *G02B 21/36* | (2006.01) |
| *G02B 21/06* | (2006.01) |
| *G02B 21/08* | (2006.01) |
| *G01N 21/35* | (2014.01) |

(52) U.S. Cl.
CPC ..... *G02B 21/0092* (2013.01); *G02B 21/0004* (2013.01); *G02B 21/0096* (2013.01); *G02B 21/06* (2013.01); *G02B 21/082* (2013.01); *G02B 21/36* (2013.01); *G01N 21/35* (2013.01); *G01N 2201/06113* (2013.01)

(58) Field of Classification Search
CPC ............ G02B 21/0092; G02B 21/0004; G02B 21/0096
See application file for complete search history.

(56) References Cited

U.S. PATENT DOCUMENTS 4,522,510 A * 6/1985 Rosencwaig ...... G01B 11/0666
356/43

2002/0123112 A1 * 9/2002 Wang ....................... B07C 5/34
435/173.9

(Continued)

FOREIGN PATENT DOCUMENTS

| WO | WO2016/177897 A1 | 5/2016 |
| WO | WO 2016/177897 A1 | 5/2016 |

OTHER PUBLICATIONS

Yeh et al., "Fast Infrared Chemical Imaging with a Quantum Cascade Laser," University of Illinois, Jul. 24, 2014, Analytical Chemistry 2015, vol. 87, pp. 485-493 (10 pages).

(Continued)

*Primary Examiner* — Hugh Maupin
(74) *Attorney, Agent, or Firm* — Imperium Patent Works; Darien K. Wallace

(57) ABSTRACT

An infrared microscope includes a radiation source, a sample plane, an objective lens, a path length modulator and a detector. The radiation source emits temporally coherent infrared radiation that propagates along an optical path of the microscope during operation. A sample is disposed in the sample plane. The detector detects the infrared radiation after the radiation interacts with the sample. The objective lens forms an image of the sample plane on the detector. The path length modulator continuously varies the optical path length of the optical path between the sample plane and the detector. The path length modulator can be a wedge or a diffusing screen that rotates during operation, a phase modulator that rotates during operation and that has regions with different indices of refraction, a tilting element that tilts about an axis during operation, or a diffuser mirror that reflects the infrared radiation and that rotates during operation.

20 Claims, 9 Drawing Sheets

(56) References Cited

U.S. PATENT DOCUMENTS

| | | | | |
|---|---|---|---|---|
| 2005/0002435 | A1* | 1/2005 | Hashimoto | G01N 25/72 374/43 |
| 2008/0308730 | A1* | 12/2008 | Vizi | G02B 21/0048 250/309 |
| 2012/0257197 | A1* | 10/2012 | Feldkhun | G01N 21/4795 356/301 |
| 2015/0153232 | A1* | 6/2015 | Xiao | G02B 21/361 250/349 |
| 2017/0276919 | A1* | 9/2017 | Frankel | G01N 21/6458 |
| 2017/0329122 | A1* | 11/2017 | Osawa | G02B 21/06 |
| 2018/0010961 | A1* | 1/2018 | Masumura | G01J 1/08 |
| 2018/0157019 | A1 | 6/2018 | Kroeger-Lui | G02B 21/0004 |
| 2018/0252695 | A1* | 9/2018 | Huang | G01N 33/4833 |
| 2018/0259553 | A1* | 9/2018 | Yang | G01Q 60/18 |

OTHER PUBLICATIONS

Kole et al., "Discrete Frequency Infrared Microspectroscopy and Imaging with a Tunable Quantum Cascade Laser," University of Illinois, Aug. 21, 2012, Analytical Chemistry 2012, vol. 84, pp. 10366-10372 (7 pages).

Schoenhals et al., "On the role of interference in laser-based mid-infrared widefield microscopy," Heidelberg University, Jan. 13, 2018, Journal of Biophotonics, 2018;e201800015 (7 pages).

Yeh et al., "Fast Infrared Chemical Imaging with a Quantum Cascade Laser," Univ. Illinois, American Chemical Society, Analytical Chemistry 2015, vol. 87, pp. 485-493 (9 pages).

Kole et al., "Discrete Frequency Infrared Microspectroscopy and Imaging with a Tunable Quantum Cascade Laser," Univ. Illinois, American Chemical Society, Analytical Chemistry 2012, vol. 84, pp. 10366-10372 (7 pages).

Schoenhals et al., "On the role of interference in laser-based mid-infrared widefield microspectroscopy," Journal of Biophotonics, Jan. 13, 2018, e201800015 (7 pages) https://doi.org/10.1002/jbio.201800015.

Office action of the German Patent Office in the related German patent application DE102017127424.3 dated Jun. 5, 2018 (5 pages).

* cited by examiner

INFRARED MICROSCOPE

CROSS REFERENCE TO RELATED APPLICATION

This application is based on and hereby claims the benefit under 35 U.S.C. § 119 from German Patent Application No. DE 102017127424.3, filed on Nov. 21, 2017, in the German Patent Office. This application is a continuation-in-part of German Patent Application No. DE 102017127424.3, the contents of which are incorporated herein by reference.

TECHNICAL FIELD

The invention relates to a microscope having a radiation source that is equipped to emit, during operation of the microscope, coherent infrared radiation that propagates along an optical path of the microscope during operation, a sample plane in which a sample is to be placed during operation, a detector that is adapted to detect the infrared radiation after its interaction with the sample, and an objective lens that is adapted to form an image of the sample plane on the detector.

BACKGROUND

Infrared microscopy is a technique for chemical imaging. Infrared radiation from the mid-infrared spectral region, more precisely the "fingerprint" region from 800 to 4000 $cm^{-1}$, resonantly excites vibrations of various molecules. From the spatially resolved determination of the absorption or transmission properties of microscopic samples under infrared irradiation, a local distribution of various chemical substances in the sample can be performed. This is thus referred to as chemical imaging. Typically, such measurements are carried out with Fourier transform infrared spectrometers (FTIR). In recent years, the first infrared microscopes have been developed that operate with coherent radiation sources, in particular with quantum cascade lasers, to illuminate the sample.

In (wide-field) microscopy, in particular in the mid-infrared spectral region with coherent radiation sources, interference of the infrared radiation typically arises, making chemical imaging of samples more difficult. The results of the pure absorption or transmission measurements are superposed by the phase information of the radiation. The chemical information hidden in the sample is thus superposed with physical information of the microscope, as for example the optical design and/or the wavelength of the infrared radiation.

The reflection at the optics used in the microscope results in the infrared radiation interfering with itself as the infrared radiation reflected back from the optics interferes with the infrared radiation that propagates toward the optics. This limits the measurement accuracy of the infrared microscopes with a coherent radiation source. Even using an antireflection coating on the optics can only partially solve the problem. Since infrared microscopes typically are meant to be used in the entire "fingerprint" region, the coatings of the optics employed must have an antireflection coating over a broad spectral region. Because of the required width of the spectral region, the coatings typically have a reflectivity of up to 10%, which is still sufficient to produce troublesome interferences.

Just as in the case of reflection at the optics, a reflection at a detector for detecting the infrared radiation can result in the interference. In this case, a resonator can be formed by the detector and a sample placed in the microscope, with the result that the interference is especially strong. An annular interference pattern characteristic of the system arises that is recorded by the detector of the microscope as soon as the sample is placed in the microscope. The rings of the interference pattern in this case are concentric to the optical axis of the microscope. This annular interference pattern superposes with the absorption information from the sample. The annular interference pattern can be observed, for example, when the coherent radiation source is a quantum cascade laser that is operated in a continuous wave mode (abbreviated: cw).

Microbolometer cameras are typically manufactured with a so-called $\lambda/4$ cavity. The $\lambda/4$ cavity has an absorber layer that absorbs the infrared radiation, a substrate, and a reflector layer (frequently aluminum) that reflects the infrared radiation and is typically located 2.5 μm behind the absorber layer and the substrate of individual pixels of the microbolometer camera. This maximizes the sensitivity of the microbolometer camera, in particular for the wavelength that corresponds to four times the distance from the absorber layer to the reflector layer. Infrared radiation that is not absorbed by the absorber layer upon initially striking the pixels of the microbolometer camera passes through this layer again after being reflected at the reflector layer. In microscopes with coherent radiation sources, even though there is a benefit from the resulting increase in sensitivity of the microbolometer camera, nevertheless, at the same time the resonator is formed between the sample and the reflector layer. Additionally contributing to the effect are reflections at the substrate, which is located directly behind the absorber layer. To describe the interference phenomenon, it is sufficient as an approximation to consider the absorber layer, the substrate, and the reflector layer of the microbolometer camera as an optical element that forms the resonator together with the sample. Because of the relatively high reflectivity of this optical element, the interference pattern is especially pronounced. The shape of the annular interference pattern depends on the detection optics used between the sample and the detector, the wavelength of the infrared radiation, and the exact distance between the sample and the detector. The amplitude of the interferences also depends on the reflective properties of the sample: the lower the absorption of the sample and the greater the reflection of the infrared radiation at a substrate on which the sample is placed, the more clearly the interferences appear.

In addition, the interference is also observed when, in place of a microbolometer camera, a different detector is used that partially reflects the infrared radiation. In this case, this can even be a single-element detector, for example. Frequently, the effect is intensified by reflections of the infrared radiation at a detector window.

It is known from WIPO Publication WO2016/177897A1 to provide a rotating diffusing screen or a rotating diffuser mirror in the optical path between the radiation source and the sample, which caused the sample to be irradiated with pseudothermal infrared radiation. As a result, the spatial coherence of the infrared radiation is reduced on average over time, which can reduce the interference. Nevertheless, the pseudothermal infrared radiation retains its ability to interfere with itself, so the annular interference pattern caused by the resonator structure consisting of the sample and detector cannot be avoided by using pseudothermal infrared radiation.

Furthermore, the annular interference pattern can be eliminated only to a limited degree by referencing a sample image to the image of an empty substrate, which is to say a reference image. The reason for this is the strong dependence of the phase of the interference pattern on the length of the resonator.

The object of the invention is therefore to create an infrared microscope having a radiation source that is adapted to emit coherent infrared radiation, in which interference is reduced that arises in the optical path of the infrared radiation between a sample of the microscope and a detector of the microscope.

SUMMARY

The invention relates to a microscope having a radiation source that is adapted to emit, during operation of the microscope, temporally coherent infrared radiation that propagates along an optical path of the microscope during operation, a sample plane in which a sample is to be placed during operation, a detector that is adapted to detect the infrared radiation after its interaction with the sample, an objective lens that is adapted to form an image of the sample plane on the detector, and an isolator arrangement that is located in the optical path between the sample plane and the detector and is adapted to allow the infrared radiation to pass only in the direction toward the detector.

In one embodiment, the infrared microscope includes a radiation source, a sample plane, an objective lens, an isolator arrangement and a detector. The radiation source emits temporally coherent infrared radiation that propagates along an optical path of the microscope during operation. A sample is disposed in the sample plane. The detector detects the infrared radiation after the infrared radiation interacts with the sample. The objective lens forms an image of the sample plane on the detector. The isolator arrangement is disposed in the optical path between the sample plane and the detector and permits the infrared radiation to travel in the optical path only in the direction towards the detector.

In another embodiment, the infrared microscope includes a radiation source, a sample plane, an objective lens, a path length modulator and a detector. The radiation source emits temporally coherent infrared radiation that propagates along an optical path of the microscope during operation. A sample is disposed in the sample plane. The detector detects the infrared radiation after the infrared radiation interacts with the sample. The objective lens forms an image of the sample plane on the detector. The path length modulator continuously varies the optical path length of the optical path between the sample plane and the detector. The path length modulator can be one of: a wedge that is transparent to the infrared radiation and that rotates during operation, a phase modulator that is transparent to the infrared radiation, that rotates during operation and that has regions with different indices of refraction, a tilting element that is transparent to the infrared radiation and that tilts about an axis during operation, a diffusing screen that is transparent to the infrared radiation and that rotates during operation, and a diffuser mirror that reflects the infrared radiation and that rotates during operation.

In yet another embodiment, the infrared microscope includes a radiation source, a sample plane, an objective lens, a mask and a detector. The radiation source emits temporally coherent infrared radiation that propagates along an optical path of the microscope during operation. A sample is disposed in the sample plane. The detector detects the infrared radiation after the infrared radiation interacts with the sample. The objective lens forms an image of the sample plane on the detector. The mask is disposed in the optical path between the sample plane and the detector. The mask has a radial mask section that blocks the infrared radiation and a radial mask-free section. The mask exhibits an inverted point symmetry about the optical axis of the microscope with respect to the radial mask section and the radial mask-free section. The mask rotates about the optical axis during operation.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 4:
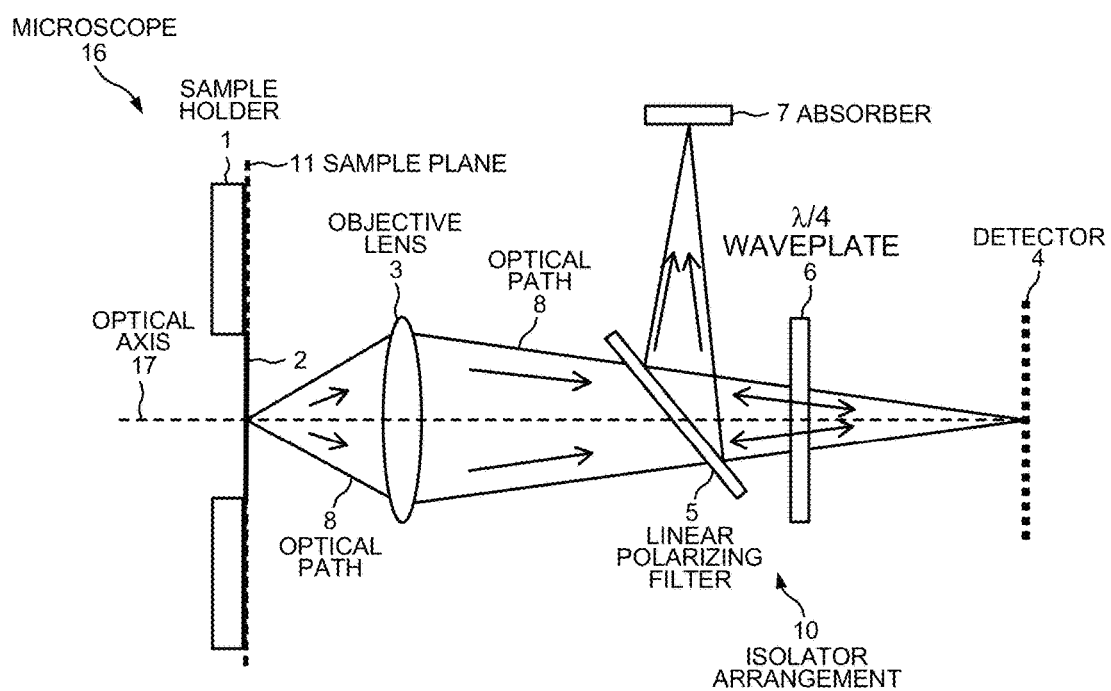
FIG. 4 shows a longitudinal section through a first embodiment of a first aspect of the microscope according to the invention.

FIG. 4 shows a first aspect of a microscope 16 that includes a radiation source 12, a sample plane 11, an objective lens 3, an isolator arrangement 10 and a detector 4. The radiation source 12 is adapted to emit, during operation of the microscope 16, temporally coherent infrared radiation that propagates along an optical path 8 of the microscope 16 during operation. A sample 2 is placed in the sample plane 11 during operation. The detector 4 is adapted to detect the infrared radiation after the radiation interacts with the sample 2. The objective lens 3 is adapted to form an image of the sample plane 11 on the detector 4. The isolator arrangement 10 is located in the optical path 8 between the sample plane 11 and the detector 4 and is adapted to allow the infrared radiation to pass only in the direction toward the detector 4.

By using the isolator arrangement 10, the formation of interference is reduced during operation. Moreover, the sample 2 and the detector 4 are prevented from forming a resonator for the infrared radiation so that no annular interference pattern can arise during operation.

The isolator arrangement 10 includes a linear polarizing filter 5 for the infrared radiation that is located in the optical path 8 between the sample plane 11 and the detector 4, and a λ/4 waveplate 6 for the infrared radiation that is located in the optical path 8 between the polarizing filter 5 and the detector 4. The isolator arrangement 10 is oriented such that the polarization direction of the infrared radiation that has passed through the linear polarizing filter 5 and has passed twice through the λ/4 waveplate 6 is rotated by 90°. In this way, the infrared radiation that has been reflected back from the detector 4 and has passed twice through the λ/4 waveplate 6 cannot pass through the linear polarizing filter again.

The linear polarizing filter 5 is tilted relative to the optical axis 17 of the microscope 16. As a result, the infrared radiation that has not passed through the linear polarizing filter 5 and is reflected by a surface of the linear polarizing filter is reflected away from the optical axis 17 and thus cannot cause interference.

It is preferred that the isolator arrangement 10 has an absorber 7 that absorbs the infrared radiation and that is arranged to absorb the infrared radiation reflected from the surface of the linear polarizing filter 5 facing the detector 4. As a result, this portion of the infrared radiation cannot disrupt a measurement of the detector 4.

In another embodiment, the isolator arrangement 10 has a Faraday isolator 9 that is located in the optical path 8 between the sample plane 11 and the detector 4. The formation of a resonator can be effectively suppressed by the Faraday isolator 9.

Figure 6:
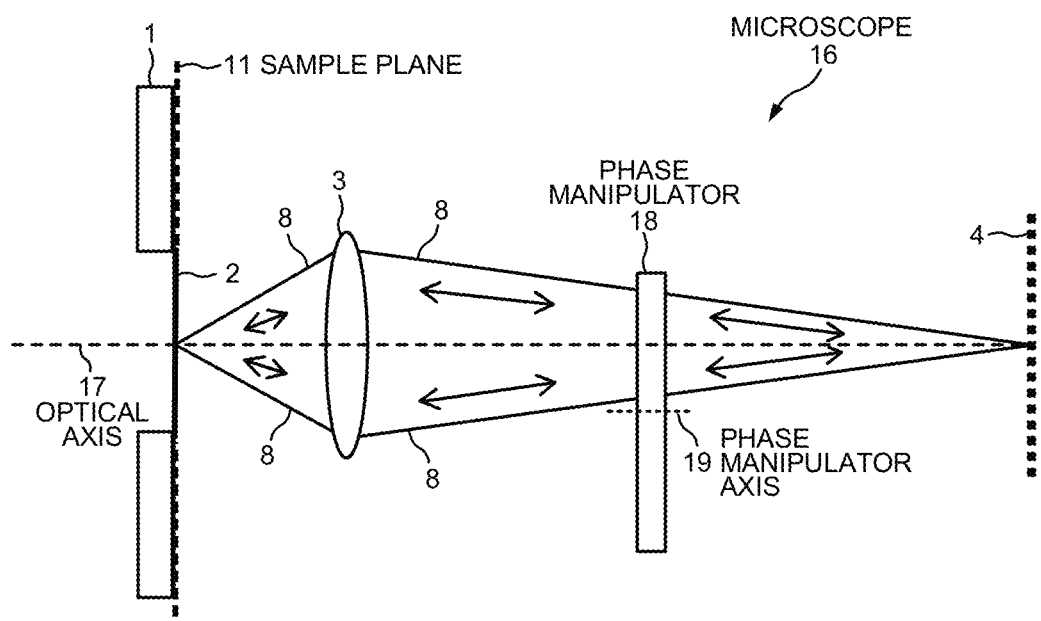
FIG. 6 shows a longitudinal section through a first embodiment of a second aspect of the microscope according to the invention.

FIG. 6 shows a second aspect of microscope 16 that has a path length modulator. The path length modulator is adapted continuously to vary the optical path length of the optical path 8 between the sample plane 11 and the detector 4. The second aspect of microscope 16 includes a radiation source 12, a sample plane 11, an objective lens 3, the path length modulator and a detector 4. FIG. 6 shows a first embodiment of the second aspect of microscope 16 in which the path length modulator is a phase manipulator 18. The radiation source 12 is adapted to emit, during operation of the microscope 16, temporally coherent infrared radiation that propagates along the optical path 8 of the microscope 16 during operation. A sample 2 is placed in the sample plane 11 during operation. The detector 4 is adapted to detect the infrared radiation after the radiation interacts with the sample 2. The objective lens 3 is adapted to form an image of the sample plane 11 on the detector 4.

By varying the optical path length between the sample 2 and the detector 4, the form of the interference varies, in particular interference having the form of an annular pattern concentric about the optical axis 17 of the microscope 16. It is now possible for the microscope 16 to be equipped to carry out an averaging over the different optical path lengths so that on average the interference is reduced or even completely eliminated.

Figure 8:
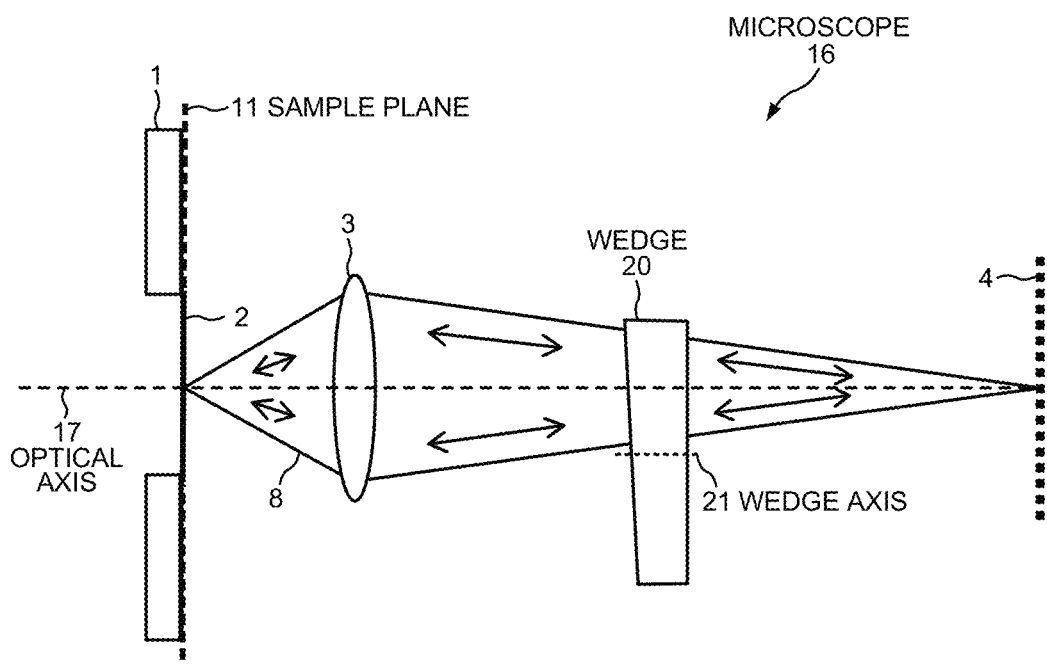
FIG. 8 shows a longitudinal section through a second embodiment of the second aspect of the microscope according to the invention.

FIG. 8 shows a second embodiment of the second aspect of microscope 16 in which the path length modulator is a wedge 20 that is transparent to the infrared radiation and is equipped to rotate in operation. In another embodiment, the path length modulator is a phase modulator that is transparent to the infrared radiation and is adapted to rotate in operation. The phase modulator has regions with different indices of refraction. In yet another embodiment, the path length modulator is a tilting element 23 that is transparent to the infrared radiation and is equipped to be tilted about an axis in operation 24. The second embodiment also includes a diffusing screen that is transparent to the infrared radiation and is adapted to rotate in operation, and/or a diffuser mirror that reflects the infrared radiation and is adapted to rotate in operation.

Figure 10:
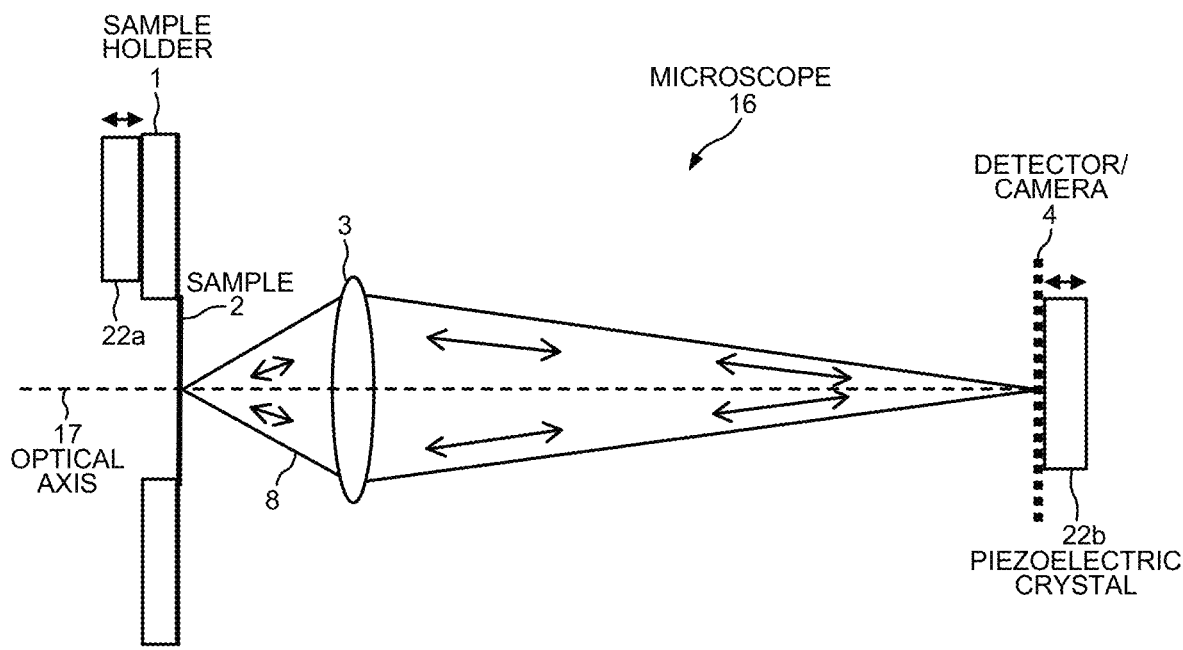
FIG. 10 shows a longitudinal section through a fourth embodiment of the second aspect of the microscope according to the invention.

FIG. 10 shows a fourth embodiment of the second aspect of microscope 16 in which the path length modulator is adapted continuously to move the sample 2 and/or the detector 4 in a direction parallel to the optical axis 17 of the microscope 16 in operation. The path length modulator preferably is adapted to vary the optical path length of the optical path 8 between the sample plane 11 and the detector 4 aperiodically, and in particular chaotically. By this means that the interference can on average be effectively reduced.

Alternatively, the path length modulator is adapted to vary the optical path length of the optical path 8 between the sample plane 11 and the detector 4 periodically. In this design, it is preferred for the microscope 16 to be equipped such that in operation the frequency at which the optical path length is varied is higher than half the readout frequency of the detector 4 or half the reciprocal integration time of the detector 4. In this way, the interferences can on average be effectively reduced.

It is preferred that the path length modulator is adapted to vary the optical path length within a range that is shorter than the depth of focus of the microscope 16. It was found that this range is sufficient to perform an averaging such that the interference is effectively reduced on average, but nevertheless ensures that the measurement of the sample 2 recorded by the detector 4 is not distorted by the variation in the optical path length. In the case in which the detector 4 is a camera, it is possible to prevent the image taken by the camera from being blurred. In the case in which the detector 4 is a single-element detector, it is possible to prevent the infrared radiation from traveling out of the detection area of the single-element detector.

Figure 11:
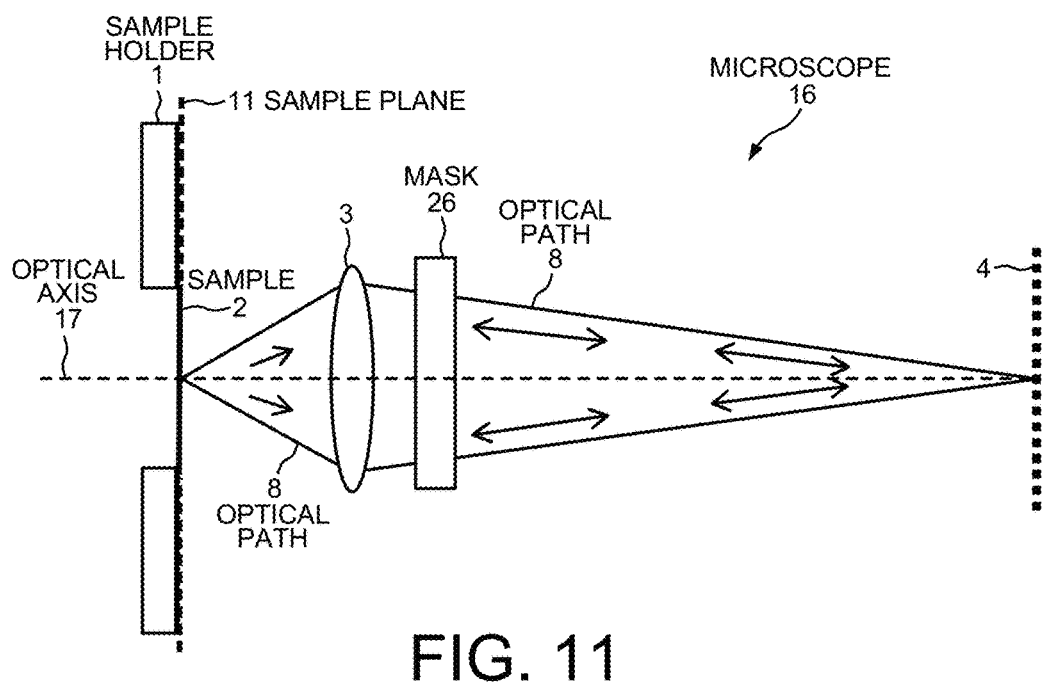
FIG. 11 shows a longitudinal section through a first embodiment of a third aspect of the microscope according to the invention.
Figure 17:
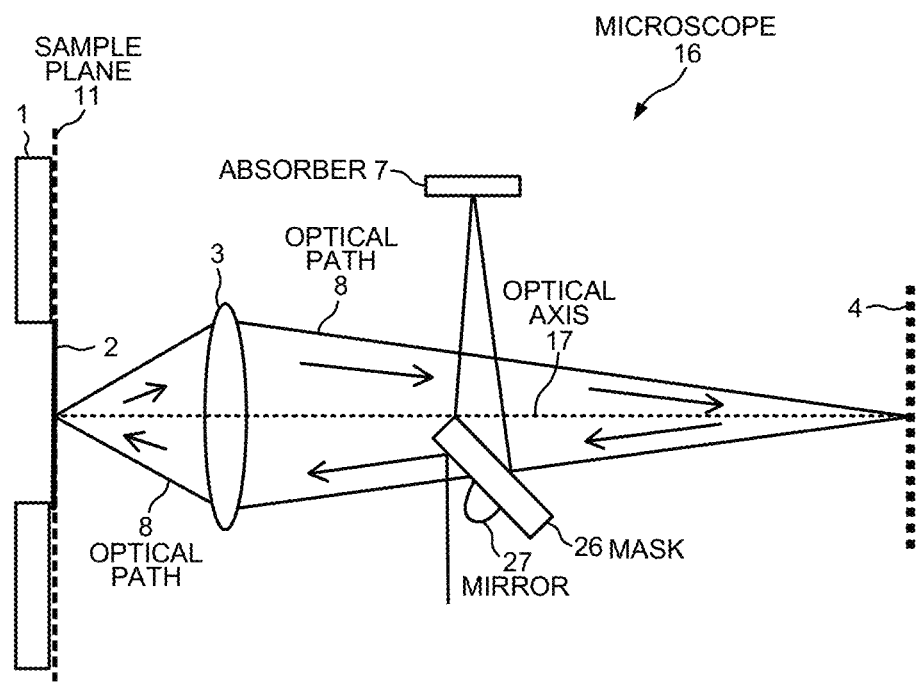
FIG. 17 shows a longitudinal section through a second embodiment of the third aspect of the microscope according to the invention.

FIGS. 11 and 17 show a third aspect of microscope 16 that has a mask 26. The third aspect of microscope 16 includes a radiation source 12, a sample plane 11, an objective lens 3, the mask 26 and a detector 4. The radiation source 12 is adapted to emit, during operation of the microscope 16, temporally coherent infrared radiation that propagates along the optical path 8 of the microscope 16 during operation. A sample 2 is placed in the sample plane 11 during operation. The detector 4 is equipped to detect the infrared radiation after the radiation interacts with the sample 2. The objective lens 3 is adapted to form an image of the sample plane 11 on the detector 4. The mask 26 is located in the optical path 8 between the sample plane 11 and the detector 4 and has at least one radial section in which the mask has at least one mask-free region. For each of the mask-free regions, there is one region apiece in which the mask blocks the infrared radiation and that is arranged with inverted point symmetry about the optical axis 17 of the microscope 16 with respect to the associated mask-free region.

In this way, the infrared radiation that has passed through the mask 26 in the direction toward the detector 4 and that is reflected back from the detector 4 cannot pass through the mask 26 again. Thus, the formation of interference is reduced. Moreover, the sample 2 and the detector 4 cannot form a resonator, which reduces the formation of interference.

The mask 26 has an inverted point symmetry about the optical axis 17 of the microscope 16 along its entire circumference. In this way, little of the infrared radiation that propagates from the sample 2 in the direction toward the detector 4 is lost, which allows the interference to be reduced while maintaining a high signal-to-noise ratio.

Radial sections of the mask 26 form at least three of the regions in which the mask blocks the infrared radiation. Every two of the regions are separated by one of the mask-free regions that is located between the two regions in the circumferential direction. The mask 26 disadvantageously reduces the spatial resolution of the microscope 16. The reduction in spatial resolution is direction-dependent and changes along the circumference. Because the at least three regions are provided, the result is advantageously achieved that the spatial resolution is made uniform in the circumferential direction.

The microscope 16 is adapted to rotate the mask 26 about the optical axis 17 in operation. By averaging over different angular positions of the mask 26, it is possible to make the spatial resolution uniform in the circumferential direction. When the mask 26 with the at least three regions is provided, it is also possible for the frequency of rotation of the mask to be reduced for an equal measurement time in comparison with a mask that has only one of the regions.

The microscope 16 is adapted such that in operation, the integration time of the detector 4 is longer than one mask rotation period, which is the time period that is associated with the shortest mask rotation after which the mask covers the same region of the optical path 8 again. The inverse of the mask rotation period corresponds to an integer multiple of the readout frequency of the detector 4. In this way, the spatial resolution can be made especially uniform in the circumferential direction.

Alternatively, the microscope 16 is adapted to make an image with the detector 4 at each of various angular positions of the mask. In this way the loss of spatial resolution due to the mask can be compensated for computationally. It is possible for the mask 26 to stop at each angular position until the detector 4 has recorded the measurement. Alternatively, it is possible to choose the integration time to be so short relative to the rotational speed of the mask that the mask stands still during the measurement. In the case where the detector 4 is a camera, the mask would in effect stand still in an image recorded by the camera.

FIG. 17 shows a second embodiment of the third aspect of microscope 16 in which the mask 26 has a mirror 27 on its side facing the sample plane 11. The mirror 27 reflects infrared radiation received from the radiation source 12 onto the sample plane 11. The radiation source 12 is adapted to deflect the infrared radiation via the mirror 27 onto the sample plane 11 so that the detector 4 is adapted to detect the infrared radiation in its diffuse reflection in operation. Here, the mask 26 advantageously performs a dual function, namely it reduces the formation of the interference and at the same time deflects the infrared radiation onto the sample plane 11 such that the sample 2 can be measured in diffuse reflection. The mask 26 is tilted relative to the optical axis 17 of the microscope 16. As a result, the infrared radiation that is reflected back by the detector 4 is reflected away from the optical axis 17 and thus advantageously cannot cause interference. It is preferred that the mask 26 is located in an aperture stop plane of the microscope 16.

Figure 15:
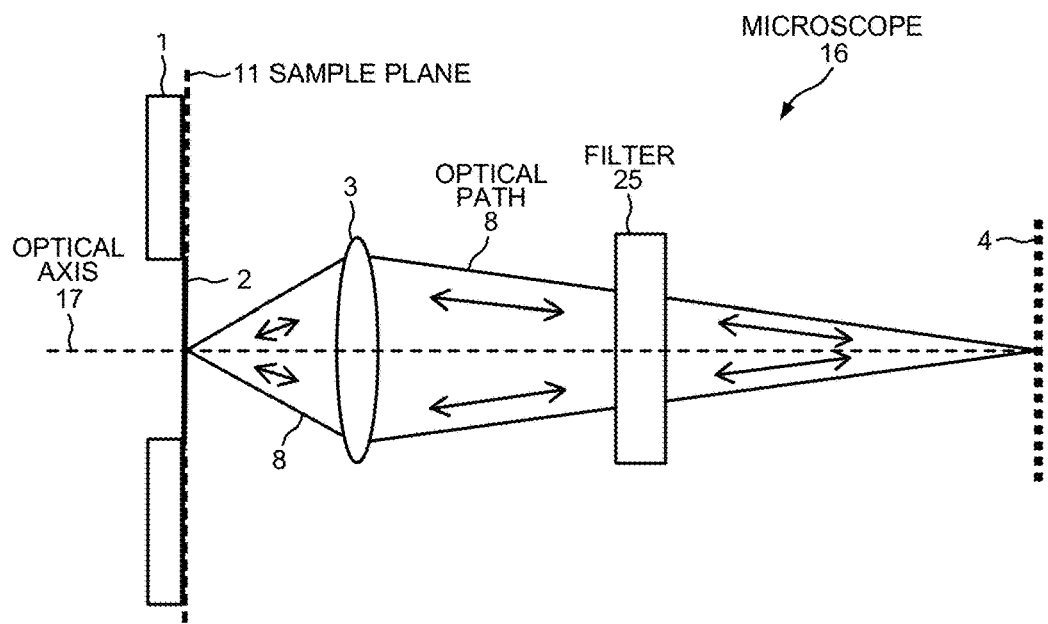
FIG. 15 shows a longitudinal section through a fourth aspect of the microscope according to the invention.

FIG. 15 shows a fourth aspect of microscope 16 that has a neutral-density filter 25. The fourth aspect of microscope 16 includes a radiation source 12, a sample plane 11, an objective lens 3, the neutral-density filter 25 and a detector 4. The radiation source 12 is equipped to emit, during operation of the microscope 16, temporally coherent infrared radiation that propagates along the optical path 8 of the microscope 16 during operation. A sample 2 is placed in the sample plane 11 during operation. The detector 4 is adapted to detect the infrared radiation after the radiation interacts with the sample 2. The objective lens 3 is adapted to form an image of the sample plane 11 on the detector 4. The neutral-density filter 25 for the infrared radiation is located in the optical path 8 between the sample plane 11 and the detector 4.

By providing the neutral-density filter 25, the infrared radiation that is reflected back by the detector 4 is attenuated and thus interferes less with the infrared radiation that propagates in the direction toward the detector 4. In this way, the formation of interference is reduced. The neutral-density filter 25 is located in an aperture stop plane of the microscope 16.

A fifth aspect of the microscope 16 has a radiation source 12 that is adapted to vary the wavelength of the infrared radiation in operation. The fifth aspect of microscope 16 includes the radiation source 12, a sample plane 11, an objective lens 3 and a detector 4. The radiation source 12 is adapted to emit, during operation of the microscope 16, temporally coherent infrared radiation that propagates along the optical path 8 of the microscope 16 during operation. A sample 2 is placed in the sample plane 11 during operation. The detector 4 is equipped to detect the infrared radiation after the radiation interacts with the sample 2. The objective lens 3 is adapted to form an image of the sample plane 11 on the detector 4. Based on the radiation source 12 varying the wavelength of the infrared radiation in operation, the detector 4 performs an averaging over several of the wavelengths. The form of the interference depends strongly on the wavelength, so averaging over several of the wavelengths reduces the interference.

It is preferred that the microscope 16 is equipped to perform the averaging in a spectral range in which the wavelength is varied less than 8 cm-1, in particular less than 4 cm-1, in particular less than 2 cm-1, in particular less than 1 cm-1. These spectral ranges are sufficiently narrow that it is possible to illuminate the sample 2 in a band of a resonance of the absorption spectrum, and thus a sufficiently measurable absorption of the infrared radiation can take place. At the same time, the wavelength is varied sufficiently in this spectral range that the averaging results in a strong reduction of the interference.

Microscope 16 is adapted to modify the infrared radiation such that the sample 2 is irradiated with pseudothermal infrared radiation, as is described in WO 2016/177897 A1. In this way, the interference can be reduced still further. The coherence length of the radiation source 12 should be longer than the distance from the sample plane 11 to the detector 4. This can be the case when the radiation source 12 is adapted to emit particularly narrow-band infrared radiation. Microscope 16 can suppress the interference, even when the coherence length of the radiation source 12 is longer than the distance from the sample plane 11 to the detector 4. The result is thus achieved that even radiation sources with particularly narrow-band infrared radiation can be used without having interference arise.

In some embodiments, the detector 4 is a camera that is equipped to record images, or is a single-element detector.

It is possible for several of the embodiments to be combined with one another. Each embodiment of the first aspect of microscope 16 has at least one of the following:
- a path length modulator that is adapted continuously to vary the optical path length of the optical path 8 between the sample plane 11 and the detector 4;
- a mask 26 that is located in the optical path 8 between the sample plane 11 and the detector 4 and that has at least one radial section in which the mask has at least one mask-free region, and for each of the mask-free regions has one region apiece in which the mask blocks the infrared radiation and that is arranged with inverted point symmetry about the optical axis 17 of the microscope 16 with respect to the associated mask-free region;
- a neutral-density filter 25 for the infrared radiation that is located in the optical path 8 between the sample plane 11 and the detector 4; and/or
- a radiation source 12 that is adapted to vary the wavelength of the infrared radiation in operation, together with a detector 4 that is adapted to perform an averaging over several of the wavelengths in operation.

Each embodiment of the second aspect of microscope 16 has at least one of the following:
- an isolator arrangement 10 that is located in the optical path 8 between the sample plane 11 and the detector 4 and that is adapted to allow the infrared radiation to pass only in the direction toward the detector 4;
- a mask 26 that is located in the optical path 8 between the sample plane 11 and the detector 4 and that has at least one radial section in which the mask has at least one mask-free region, and for each of the mask-free regions has one region apiece in which the mask blocks the infrared radiation and that is arranged with inverted point symmetry about the optical axis 17 of the microscope 16 with respect to the associated mask-free region;
- a neutral-density filter 25 for the infrared radiation that is located in the optical path 8 between the sample plane 11 and the detector 4; and/or
- a radiation source 12 that is adapted to vary the wavelength of the infrared radiation in operation, together with a detector 4 that is adapted to perform an averaging over several of the wavelengths in operation;

Each embodiment of the third aspect of microscope 16 has at least one of the following:
- an isolator arrangement 10 that is located in the optical path 8 between the sample plane 11 and the detector 4 and that is equipped to allow the infrared radiation to pass only in the direction toward the detector 4;
- a path length modulator that is adapted continuously to vary the optical path length of the optical path 8 between the sample plane 11 and the detector 4;
- a neutral-density filter 25 for the infrared radiation that is located in the optical path 8 between the sample plane 11 and the detector 4; and/or
- a radiation source 12 that is adapted to vary the wavelength of the infrared radiation in operation, together with a detector 4 that is adapted to perform an averaging over several of the wavelengths in operation.

Each embodiment of the fourth aspect of microscope 16 has at least one of the following:
- an isolator arrangement 10 that is located in the optical path 8 between the sample plane 11 and the detector 4 and that is equipped to allow the infrared radiation to pass only in the direction toward the detector 4;
- a path length modulator that is equipped to continuously vary the optical path length of the optical path 8 between the sample plane 11 and the detector 4;
- a mask 26 that is located in the optical path 8 between the sample plane 11 and the detector 4, and that has at least one radial section in which the mask has at least one mask-free region, and for each of the mask-free regions has one region apiece in which the mask blocks the infrared radiation and that is arranged with inverted point symmetry about the optical axis 17 of the microscope 16 with respect to the associated mask-free region; and/or
- a radiation source 12 that is adapted to vary the wavelength of the infrared radiation in operation, together with a detector 4 that is equipped to perform the averaging over several of the wavelengths in operation.

As is evident from FIGS. 3-11, 15 and 17, a microscope 16 has a radiation source 12 that is adapted to emit temporally coherent infrared radiation during operation of the microscope 16. The radiation source 12 can be, for example, a quantum cascade laser, which in particular is a quantum cascade laser in an external cavity. The radiation source 12 can be a "distributed feedback" (DFB) laser or a "distributed Bragg reflector" (DBR) laser, for example. In addition, the radiation source 12, in particular a quantum cascade laser, can be tunable. The tunable wavelength range of the light source 12 can be from 5 µm to 12.5 µm, for example. The infrared radiation propagates along an optical path 8 of the microscope 16 during operation. The microscope 16 has a sample plane 11 in which a sample 2 is placed during operation. The microscope 16 has a sample holder 1 to hold the sample 2. In addition, the microscope 16 has a detector 4 that is adapted to detect the infrared radiation after its interaction with the sample 2, and an objective lens 3 that is adapted to form an image of the sample plane 11 on the detector 4, which means that in operation with the objective lens 3 a sharp image of the sample plane 11 is created on the detector 4. The detector 4 of FIGS. 3-11, 15 and 17 can be a camera that has a multiplicity of pixels and that is adapted to record an image of the sample plane 11. The camera can be, for example, a thermal sensor, in particular a microbolometer camera. However, it is also possible for the detector 4 to have only one element. In addition, the detector 4 can be a semiconductor detector, such as, for example, an MCT detector (based on an alloy of mercury, cadmium, and telluride), in particular with multiple elements. It is also possible for the detector to have at least one thermopile, in particular multiple thermopiles. It is also possible for the detector to be a pyroelectric detector, in particular with multiple elements.

For the case in which the detector 4 has only a single element, the microscope 16 can be equipped to assemble an image of the sample plane 11 from a multiplicity of individual images. To this end, the microscope 16 is adapted to illuminate the sample plane 11 with the infrared radiation at one point and to take an image. The microscope 16 is additionally adapted to then illuminate the sample plane 11 with the points in a raster pattern, take an image for each point, and thus assemble the image.

Figure 3:
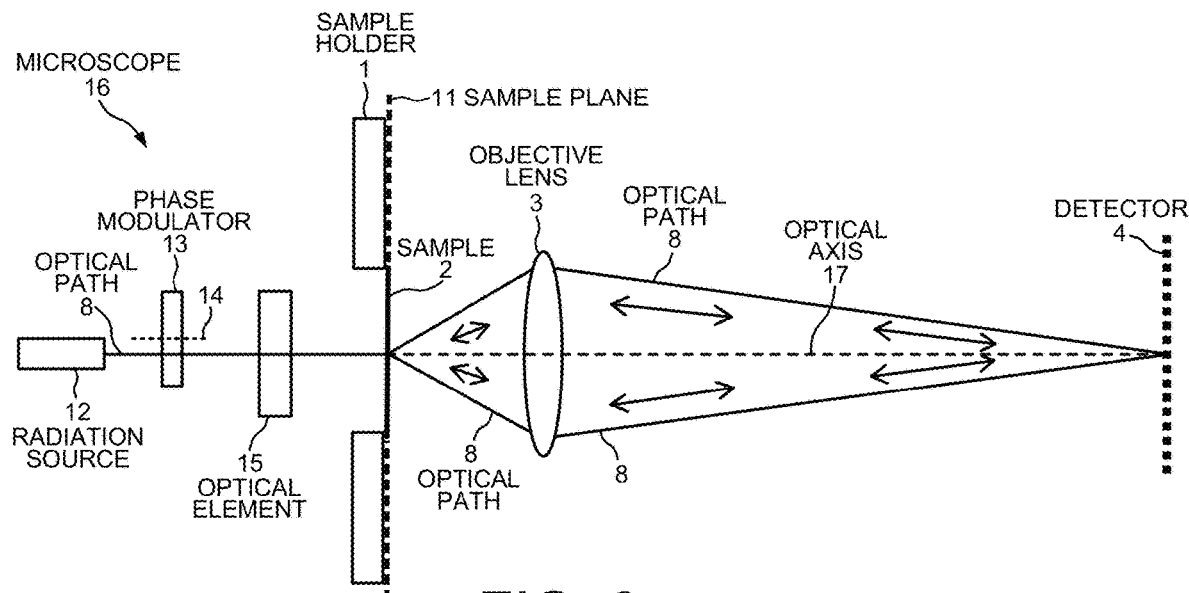
FIG. 3 shows a longitudinal section through a conventional microscope.

The embodiments of microscope 16 shown in FIGS. 3-11 and 15 are equipped to measure the infrared radiation in transmission with the sample 2. However, it is also possible for the microscope 16 to be equipped to measure the infrared radiation in diffuse reflection with the sample 2, as is shown in FIG. 17. The objective lens 3 is adapted to produce an image of the sample plane 11 on the detector 4 with a magnification of ≥1. In FIG. 3, an optical axis 17 of the microscope 16 is drawn representing the axis in all of the embodiments of microscope 16.

In FIG. 3, for the basic microscope 16 it is additionally indicated by the double-headed arrows between the sample plane 11 and the detector 4 that a part of the infrared radiation is reflected back from the detector 4. The infrared radiation that is reflected back from the detector 4, together with the infrared radiation that propagates in the direction toward the detector 4, creates interference that is detected in operation by the detector 4 and leads to distortion of the measurement. Moreover, in operation the sample 2 and the detector 4 can form a resonator that results in especially strong interference being detected by the detector 4. When the detector 4 is a camera, the interference forms an annular interference pattern. An especially strong interference can form when the coherence length of the radiation source 12 is longer than the distance from the sample plane 11 to the detector 4. This is normally the case when the radiation source 12 is a quantum cascade laser operated in a continuous wave mode, a "distributed feedback" (DFB) laser, or a "distributed Bragg reflector" (DBR) laser.

As is evident from FIG. 3, the basic microscope 16 is adapted to modify the infrared radiation such that the sample 2 is irradiated with pseudothermal infrared radiation. To this end, the microscope 16 has a phase modulator 13 that is located in the optical path 8 between the light source 12 and the sample plane 11 and that is adapted to rotate in operation about an axis of rotation 14 of the phase modulator 13. The phase modulator 13 can be a diffusing screen or a diffuser mirror, for example. An optical element 15 can be located between the phase modulator 13 and the sample plane 12. The optical element 15 can be adapted to increase the beam diameter of the infrared radiation, for example.

Figure 1:
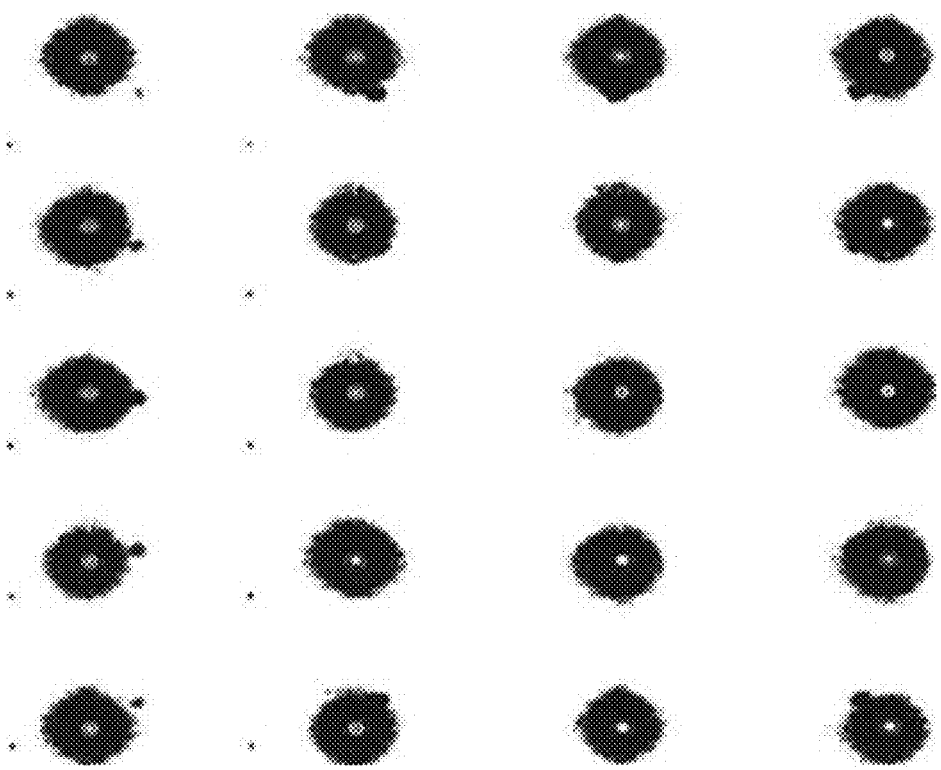
FIG. 1 shows twenty images taken with a conventional microscope, wherein the magnification is 1.
Figure 2:
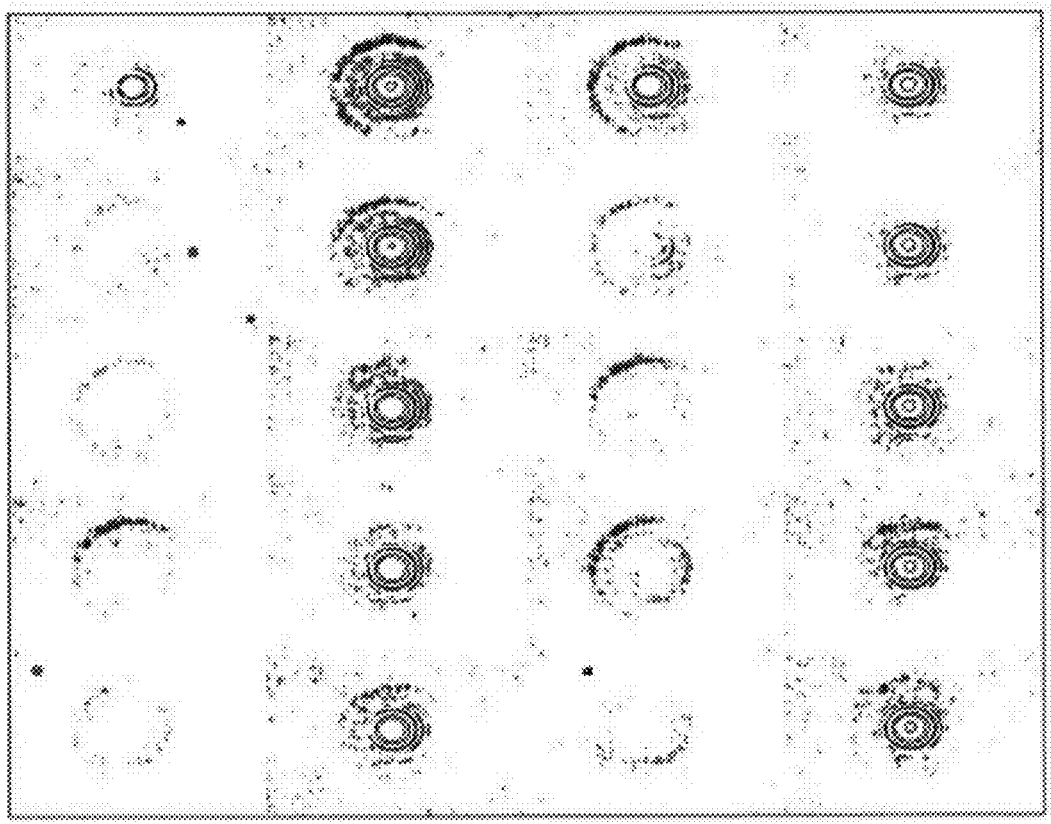
FIG. 2 shows twenty images taken with a conventional microscope, wherein the magnification is 10.

FIGS. 1-2 show measurements with the microscope 16 of FIG. 3 of the relative absorbance of an empty barium fluoride crystal as the sample 2. In FIGS. 1-2, 13 and 16, the positive and negative exceedance of an optical density of 0.015 is shown. In FIG. 1, the magnification is 1, and in FIG. 2 the magnification is 10. The wave number of the infrared radiation is 1600 $cm^{-1}$, where the distance between the sample 2 and the detector or camera 4 is approximately 100 mm. The images are assembled from 4×5 individual images, with a field of view in each case of 1.088×0.816 mm2, or 10.88×8.16 mm2 together. Each individual image was referenced in each case to a separate individual image of an arbitrarily chosen, uniquely defined location on the barium fluoride crystal. In this process, the barium fluoride crystal was positioned with a positioning accuracy of 0.5 μm relative to the camera 4. Even a change in the distance from the barium fluoride crystal to the camera 4 of less than 1 μm impairs the phase of the interference pattern clearly enough that despite referencing the individual images to the applicable reference image, concentric rings can be seen in the transmission image calculated therefrom. Thus, the phase of the interference pattern can react sensitively to changes in the distance from the sample 2 to the camera 4 that are considerably smaller than the depth of focus (also called the depth of field) of the microscope 16. In the present case, the depth of focus is approximately 5 μm for an objective lens 3 that provides a magnification of 10 and approximately 50 μm for an objective lens 3 that provides a magnification of 1. In each image, the standard deviation of its absorbance is calculated in its middle quarter, and an average value of the standard deviation is calculated over the twenty images. This average value of the standard deviation of the absorbance is 0.0136 for the magnification of 1 shown in FIG. 1 and 0.0108 for the magnification of 10 shown in FIG. 2.

FIGS. 4-11, 15 and 17 show different embodiments of microscope 16, wherein only the region from the sample holder 1 to the detector 4 is shown in each case. However, for these embodiments, it is possible for the microscope 16 to be adapted to modify the infrared radiation such that the sample 2 is irradiated with the pseudothermal infrared radiation as shown in FIG. 3.

Figure 5:
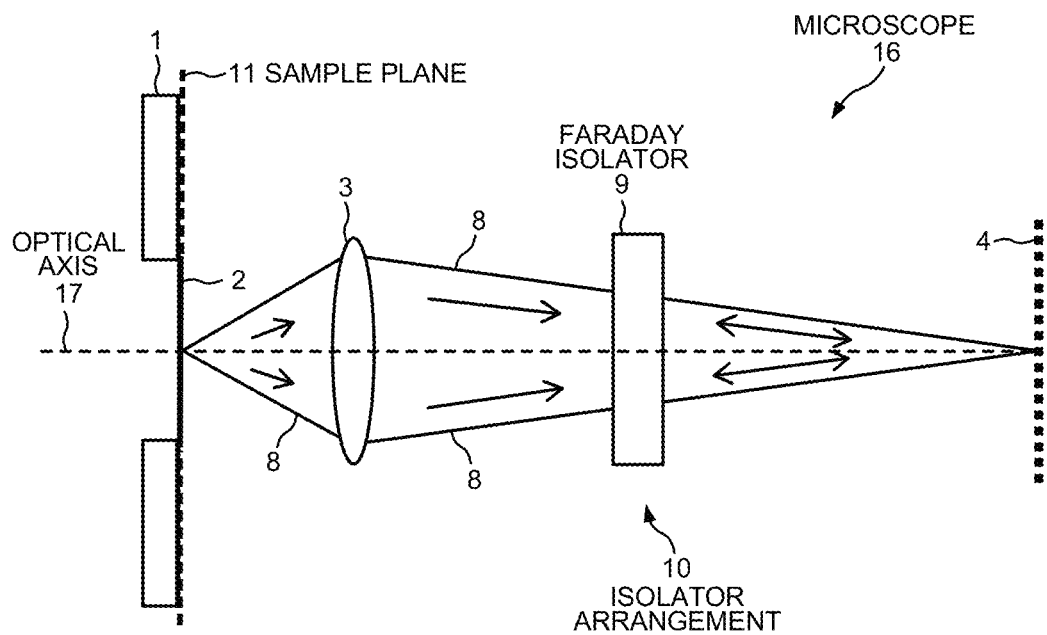
FIG. 5 shows a longitudinal section through a second embodiment of the first aspect of the microscope according to the invention.

FIGS. 4-5 show first and second embodiments of a first aspect of microscope 16 that has an isolator arrangement 10. The isolator arrangement 10 is located in the optical path 8 between the sample plane 11 and the detector 4, and is adapted to allow the infrared radiation to pass only in the direction toward the detector 4. In this design, the isolator arrangement 10 is dimensioned sufficiently large so that in operation all of the infrared radiation transmitted through the sample plane 11 is captured by the isolator arrangement 10.

In the first embodiment of the first aspect of microscope 16 as shown in FIG. 4, the isolator arrangement 10 has a linear polarizing filter 5 for the infrared radiation that is transmitted along the optical path 8 between the sample plane 11 and the detector 4, and has a λ/4 waveplate 6 for the infrared radiation that passes along the optical path 8 between the polarizing filter 5 and the detector 4 and is oriented such that the polarization direction of the infrared radiation that has passed through the linear polarizing filter 5 and has passed twice through the λ/4 waveplate 6 is rotated by 90°. Accordingly, after interacting with the sample 2, the infrared radiation passes through the linear polarizing filter 5, after which the infrared radiation is linearly polarized. Next, the infrared radiation passes through the λ/4 waveplate 6. A part of the infrared radiation is reflected back by the detector 4 and passes through the λ/4 waveplate 6 a second time. In this way, the part of the infrared radiation that is reflected back from the detector 4 twice experiences the delay of the λ/4 waveplate 6, so the latter acts like a λ/2 waveplate 6 for the reflected part. Now, because the extraordinary axis of the λ/4 waveplate 6 is located at an angle of 45° relative to the direction of polarization of the infrared radiation emerging from the linear polarizing filter 5, the result is achieved that the polarization direction of the infrared radiation that has passed through the linear polarizing filter 5 and has passed twice through the λ/4 waveplate 6 is rotated by 90°.

As is evident from FIG. 4, the linear polarizing filter 5 is tilted relative to the optical axis 17 of the microscope 16. In this design, an angle of, e.g., 30° to 60°, in particular 45°, between the normal of the linear polarizing filter 5 and the optical axis 17 is possible. The microscope 16 also has an absorber 7 that absorbs the infrared radiation and that is arranged to absorb the infrared radiation reflected from the surface of the linear polarizing filter 5 facing the detector 4.

In the second embodiment of the first aspect of microscope 16 as shown in FIG. 5, the isolator arrangement 10 has a Faraday isolator 9 that is located in the optical path 8 between the sample plane 11 and the detector 4.

FIGS. 6-10 show a second aspect of microscope 16, which has a path length modulator that is adapted to continuously vary the optical path length of the optical path 8 between the sample plane 11 and the detector 4. In this design, the detector 4 is adapted to carry out an averaging over several of the optical path lengths. The path length modulator is adapted to vary the optical path length within a region that is shorter than the depth of focus of the microscope 16. The path length modulator can be adapted to vary the optical path length of the optical path 8 between the sample plane 11 and the detector 4 aperiodically, and in particular chaotically. Alternatively, the path length modulator can be adapted to vary the optical path length of the optical path 8 between the sample plane 11 and the detector 4 periodically. In this case, the interference can be suppressed especially well if the microscope 16 is equipped such that the frequency at which the optical path length is varied in operation is higher than half the readout frequency of the detector 4 or half the reciprocal integration time of the detector 4. In the case where the detector 4 is a camera, the readout frequency is the picture frequency of the camera.

Figure 7:
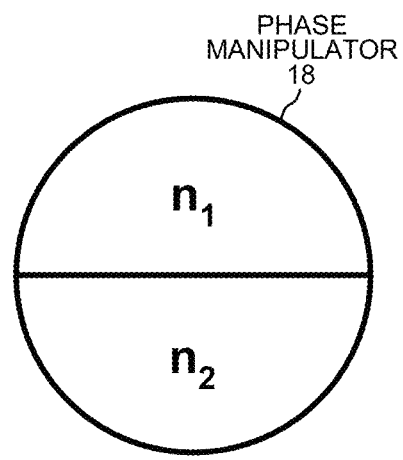
FIG. 7 shows a top view of a component of the microscope of FIG. 6.

In the first embodiment of the second aspect of microscope 16 shown in FIG. 6, the path length modulator has a phase manipulator 18 that is transparent to the infrared radiation and has regions with different indices of refraction (n1, n2) and is adapted to rotate in operation about a phase manipulator axis of rotation 19. The phase manipulator axis of rotation 19 in this design can be arranged such that it is not struck by the infrared radiation, so that all of the infrared radiation undergoes a variation in the optical path length. In addition, it is possible for the phase manipulator axis of rotation 19 to be arranged substantially parallel to the optical axis 17. FIG. 7 shows an example of one such phase manipulator 18. The phase manipulator 18 has the form of a circular disk, wherein one half-circle of the disk has an index of refraction n1 and the other half-circle of the disk has an index of refraction n2. Here, n1 is different from n2.

In the second embodiment of the second aspect of microscope 16 as shown in FIG. 8, the path length modulator has a wedge 20 that is transparent to the infrared radiation and that is adapted to rotate about a wedge axis of rotation 21 in operation. Due to the rotation of the wedge 20, a specific region of the optical path passes through a different-length section of the wedge. The wedge axis of rotation 21 here can be arranged such that it is not struck by the infrared radiation, so that all of the infrared radiation undergoes a variation in the optical path length. In addition, it is possible for the wedge axis of rotation 21 to be arranged substantially parallel to the optical axis 17.

Figure 9:
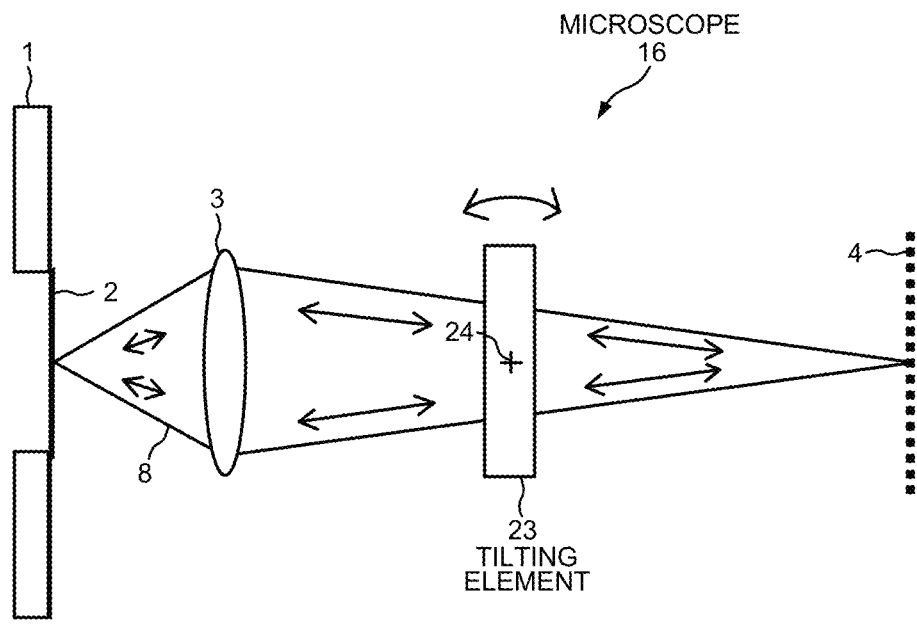
FIG. 9 shows a longitudinal section through a third embodiment of the second aspect of the microscope according to the invention.

In the third embodiment of the second aspect of microscope 16 as shown in FIG. 9, the path length modulator has a tilting element 23 that is transparent to the infrared radiation and that is adapted to be tilted about an axis 24 in operation. The tilting motion is indicated in FIG. 9 by a curved, double-headed arrow.

In the fourth embodiment of the second aspect of microscope 16 as shown in FIG. 10, the path length modulator is adapted to continuously move the sample 2 and/or the camera 4 during operation in a direction parallel to the optical axis 17 of the microscope 16. To this end, the path length modulator has a first piezoelectric crystal 22a that is adapted to move the sample holder 1 and/or the sample 2, and/or a second piezoelectric crystal 22b that is adapted to move the detector 4. The motions parallel to the optical axis 17 are indicated by double-headed arrows at the piezoelectric crystals 22a and 22b.

In a fifth embodiment of the second aspect of microscope 16, the path length modulator has a diffusing screen that is transparent to the infrared radiation and that is adapted to rotate in operation. Alternatively, the path length modulator has a diffuser mirror that reflects the infrared radiation and is adapted to rotate in operation. The diffusing screen and the diffuser mirror have rough surfaces. The diffusing screen and/or the diffuser mirror in this design can be arranged such that in operation their axis of rotation is not struck by the infrared radiation so that all regions of the infrared radiation undergo a variation in the optical path length.

FIGS. 11 and 17 show a third aspect of microscope 16 that has a mask 26 located in the optical path 8 between the sample plane 11 and the detector 4. The mask 26 has at least one radial section in which the mask 26 has at least one mask-free region, and for each of the mask-free regions has one region apiece in which the mask 26 blocks the infrared radiation. The mask 26 is arranged with inverted point symmetry about the optical axis 17 of microscope 16 with respect to the associated mask-free region. The mask 26 should have at least one diameter that is greater than the diameter of the infrared radiation at the location in the microscope 16 at which the mask 26 is located.

Each radial section of the mask 26 along its entire circumference has an inverted point symmetry about the optical axis 17 of the microscope 16. In order to suppress the interference effectively and to lose as little as possible of the infrared radiation at the mask 26, all of the mask has inverted point symmetry. This can be implemented by simple design means if the microscope 16 has a sleeve that holds the mask 26 together radially on the outside. The sleeve can be provided with a diameter such that it is located outside the optical path 8 and thus is not impinged upon by the infrared radiation in operation. To suppress scattered light, the mask 26 can additionally be made of a material that absorbs the infrared radiation, Alternatively, the mask 26 can be coated with a material that absorbs infrared radiation, in particular on the side of the mask 26 that faces the detector 4.

FIG. 11 shows a first embodiment of the third aspect of microscope 16 in which the mask 26 is perpendicular to the optical axis 17.

FIG. 17 shows a second embodiment of the third aspect of microscope 16 in which the mask 26 has a mirror 27 on its side facing the sample plane 11 that reflects infrared radiation. The radiation source 12 is adapted to allow the infrared radiation to be deflected by the mirror 27 onto the sample plane 11 so that the detector 4 detects the infrared radiation in its diffuse reflection in operation. As is evident from FIG. 17, the mask 26 is tilted relative to the optical axis 17 of the microscope 16, specifically relative to the part of the optical axis 17 that describes the optical path 8 of the microscope 16 from the sample plane 11 to the detector 4. In this regard, an angle of 30° to 60°, in particular 45°, between the normal of the mask 26 and the optical axis 17 can be used. In addition, the second embodiment of the third aspect has an absorber 7 that is arranged to absorb the infrared radiation reflected from the surface of the mask 26 facing the detector 4. Alternatively or in addition to tilting the mask 26, the side of the mask 26 facing the detector 4 is adapted to absorb the infrared radiation.

Figure 12:
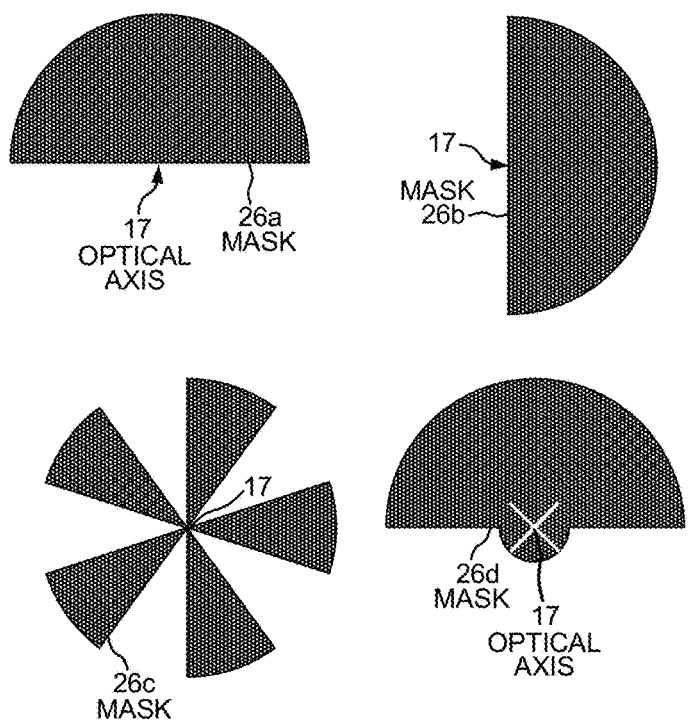
FIG. 12 shows four different embodiments of a mask that is built into the microscope of FIG. 11.
Figure 18:
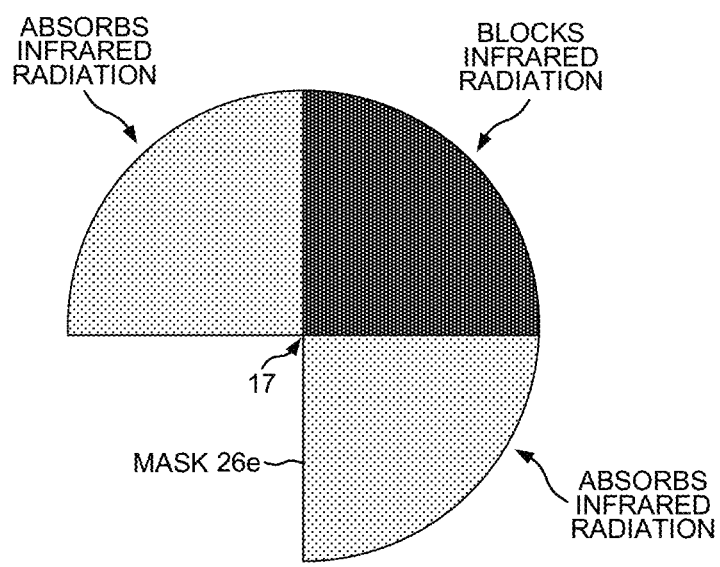
FIG. 18 shows a fifth embodiment of the mask that is built into the microscope of FIG. 11.

FIGS. 12 and 18 show five different embodiments of the mask 26. A fifth mask 26e shown in FIG. 18 has a mask-free region that has the shape of a quarter-circle and extends from 6 o'clock to 9 o'clock. The fifth mask 26e also has a region that blocks the infrared radiation and that is arranged with inverted point symmetry about the optical axis 17 of the microscope 16 with respect to the associated mask-free region, which is to say from 12 o'clock to 3 o'clock and likewise in the shape of a quarter-circle. The fifth mask 26e has additional regions in which the mask 26e absorbs the infrared radiation, namely from 9 o'clock to 12 o'clock and from 3 o'clock to 6 o'clock.

The four masks 26 of FIG. 12 have, in the radial section along their entire circumference, an inverted point symmetry about the optical axis 17 of the microscope 16. The first mask 26a and second mask 26b of FIG. 12 have the form of a half-circle, wherein the optical axis 17 lies at the center point of the half-circle. The first mask 26a is rotated by 90° as compared to the second mask 26b. A fourth mask 26d of FIG. 12 has the form of a half-circle in its radially outer region and the form of a full circle in its radially inner region, wherein the radius of the half-circle is larger than the radius of the full circle. The center points of the half-circle and of the full circle in this case lie on the optical axis 17. The radius of the full circle preferably is shorter than 50% of the radius of the half-circle. In this way the result is advantageously achieved that only a small portion of the infrared radiation is lost at the full circle. In a third mask 26c of FIG. 12, the radial section has at least three regions in which the mask 26 blocks the infrared radiation, wherein every two of the regions are separated by one of the mask-free regions that is located between the two regions in the circumferential direction.

Figure 14:
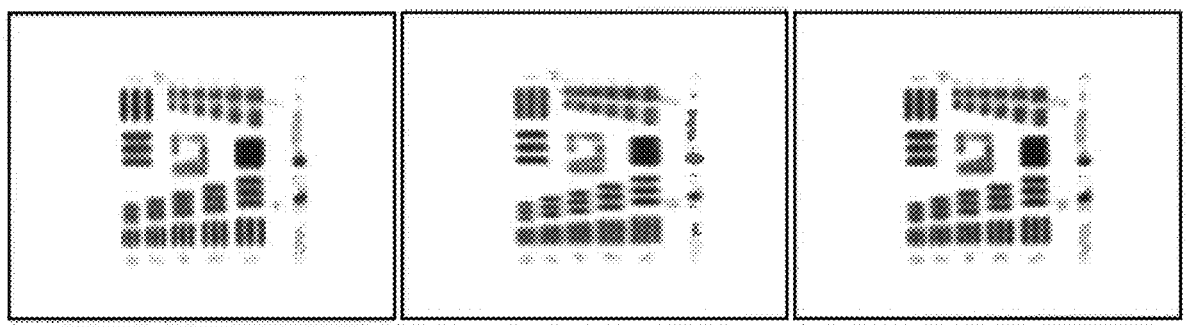
FIG. 14 shows three images of a test object taken with the microscope of FIG. 11, wherein the three images were taken with different angular positions of a mask of FIG. 12.

FIG. 14 shows three images of a test object (1951 USAF resolution test chart, chrome on calcium fluoride) that were taken with the first embodiment of the third aspect of microscope 16. The left-hand image was taken with the first mask 26a, the center image was taken with the second mask 26b, and the right-hand image was taken with a mask that has the same shape as the masks 26a and 26b, but is rotated by 45° in the circumferential direction relative to the masks 26a and 26b. It is evident that the left-hand image has a reduction in spatial resolution in the vertical direction, the center image has a reduction in spatial resolution in the horizontal direction, and the right-hand image has a reduction in spatial resolution in the diagonal direction.

In order to make this reduction in the spatial resolution uniform in the circumferential direction, the microscope 16 can be adapted to rotate the mask 26 about the optical axis 17 in operation. To make the spatial resolution especially uniform in the circumferential direction, the microscope 16 can be equipped such that in operation, the integration time of the detector 4, in particular camera 4, is longer than one mask rotation period, which is the time period that is associated with the shortest mask rotation after which the mask 26 covers the same region of the optical path 8 again. It is likewise possible for the inverse of the mask rotation period to correspond to an integer multiple of the readout frequency of the detector 4. In the case where the detector 4 is a camera, the readout frequency is the picture frequency of the camera. For the first mask 26a, the second mask 26b, and the fourth mask 26d, the time period corresponds to one complete rotation of the mask. For the third mask 26c, the time period corresponds to 1/N of a complete rotation of the mask 26c, wherein N is the number of regions in which the mask 26 blocks the infrared radiation, wherein every two of the regions are separated by one of the mask-free regions that is located between the two regions in the circumferential direction. In the case of FIG. 5, the mask has a total of five of the regions, so that the time period corresponds to one fifth of a complete rotation of the mask 26c.

The mask 26 can be located in an aperture stop plane of the microscope 16. All planes in the optical path 8 that are perpendicular to the optical axis 17 and do not lie on an image plane, an object plane, or an intermediate image plane of the microscope 16 come into consideration as the aperture stop plane. In one special embodiment, the aperture stop plane is additionally located away from a focus of the objective lens 3.

Figure 13:
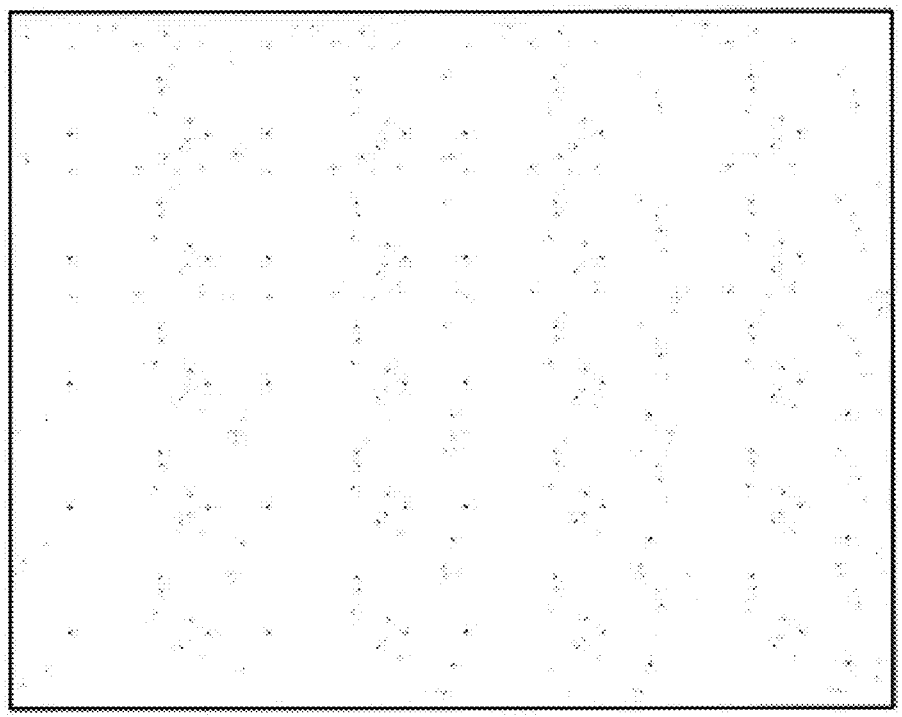
FIG. 13 shows twenty images taken with the microscope of FIG. 11.

FIG. 13 shows the measurement of the relative absorbance of the empty barium fluoride crystal, which was measured with the third aspect of microscope 16 and the mask 26a and a magnification of 1. The wave number of the infrared radiation is 1600 cm-1. The interference is significantly suppressed as compared with FIG. 1. The average value of the standard deviation of the relative absorbance values in the center quarter of the field of view of the individual images has been reduced by the insertion of the mask 26 from 0.0136 in FIG. 1 to 0.0033 in FIG. 13.

FIG. 15 shows a fourth aspect of microscope 16 that has a neutral-density filter 25 for the infrared radiation that is located in the optical path 8 between the sample plane 11 and the detector 4. In this design the neutral-density filter 25 can be made sufficiently large and can be located such that all of the infrared radiation transmitted through the sample plane 11 passes through the neutral-density filter 25. The neutral-density filter 25 can be, for example, a polymer film, a liquid cell, and/or an optical element with plasmonic structures. In this design, the neutral-density filter 25 can be located in an aperture stop plane of the microscope 16. All planes in the optical path 8 that are perpendicular to the optical axis 17 and that do not lie on the image plane, the object plane, or an intermediate image plane of the microscope 16 come into consideration as the aperture stop plane. To protect the neutral-density filter 25 from excessive stress due to the infrared radiation, the neutral-density filter 25 can also be located away from a focus of the objective lens 3.

Figure 16:
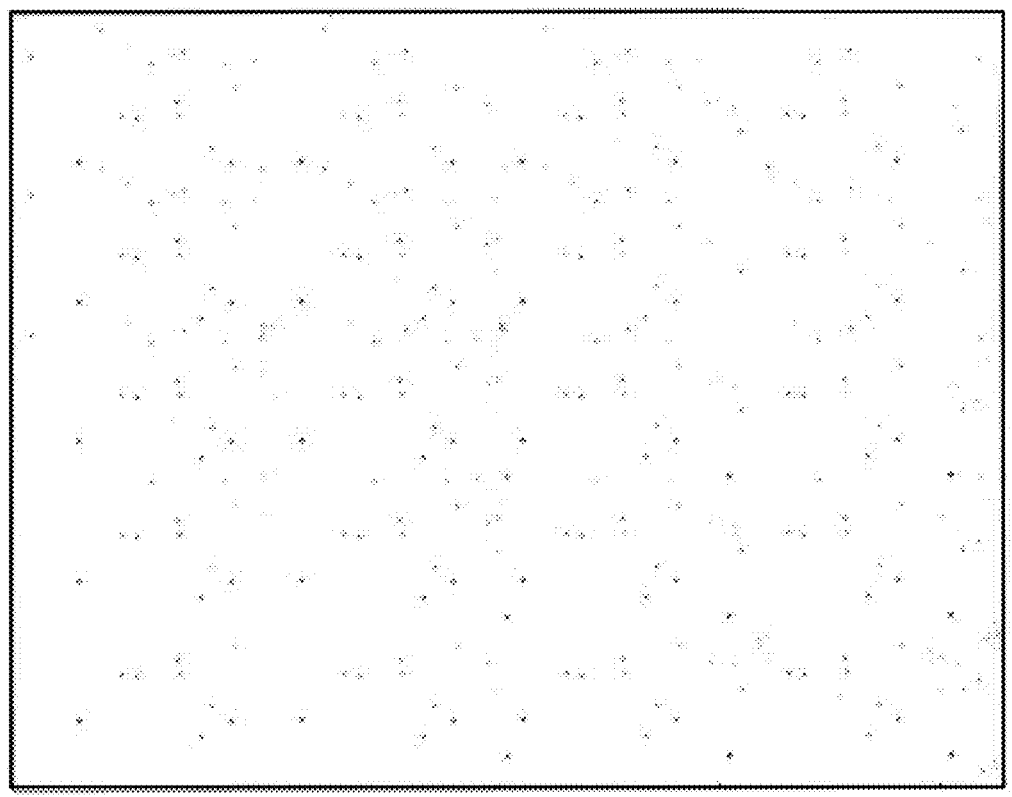
FIG. 16 shows twenty images taken with the microscope of FIG. 15.

FIG. 16 shows the measurement of the relative absorbance of the empty barium fluoride crystal, which was measured with the fourth aspect of microscope 16 and three of the neutral-density filters 25 at a magnification of 1. The wave number of the infrared radiation is 1600 cm-1. The interference is significantly suppressed as compared with FIG. 1. The average value of the standard deviation of the relative absorbance values in the center quarter of the field of view of the individual images has been reduced by the insertion of the neutral-density filters 25 from 0.0136 in FIG. 1 to 0.0033 in FIG. 16.

In addition, the following items are disclosed:

1. A microscope having a radiation source 12 that is adapted to emit, during operation of the microscope 16, temporally coherent infrared radiation that propagates along an optical path 8 of the microscope 16, a sample plane 11 in which a sample 2 is to be placed during operation, a detector 4 that is adapted to detect the infrared radiation after its interaction with the sample 2, an objective lens 3 that is adapted to form an image of the sample plane 11 on the detector 4, and an isolator arrangement 10 that is located in the optical path 8 between the sample plane 11 and the detector 4 and is adapted to allow the infrared radiation to pass only in the direction toward the detector 4.

2. The microscope of item 1, wherein the isolator arrangement 10 has a linear polarizing filter 5 for the infrared radiation that is located in the optical path 8 between the sample plane 11 and the detector 4, and has a λ/4 waveplate 6 for the infrared radiation that is located in the optical path 8 between the polarizing filter 5 and the detector 4 and is oriented such that the polarization direction of the infrared radiation that has passed through the linear polarizing filter 5 and has passed twice through the λ/4 waveplate 6 is rotated by 90°.

3. The microscope of item 2, wherein the linear polarizing filter 5 is tilted relative to the optical axis 17 of the microscope 16.

4. The microscope of item 2 or 3, wherein the isolator arrangement 10 has an absorber 7 that absorbs the infrared radiation and that is arranged to absorb the infrared radiation reflected from the surface of the linear polarizing filter 5 facing the detector 4.

5. The microscope of one of items 1 through 4, wherein the isolator arrangement 10 has a Faraday isolator 9 that is located in the optical path 8 between the sample plane 11 and the detector 4.

6. The microscope of one of items 1 through 5, wherein the microscope 16 is adapted to modify the infrared radiation such that the sample 2 is irradiated with pseudothermal infrared radiation.

7. The microscope of one of items 1 through 6, wherein the coherence length of the radiation source 12 is longer than the distance from the sample plane 11 to the detector 4.

8. A microscope having a radiation source 12 that is adapted to emit, during operation of the microscope 16, temporally coherent infrared radiation that propagates along an optical path 8 of the microscope 16 during operation, a sample plane 11 in which a sample 2 is to be placed during operation, a detector 4 that is adapted to detect the infrared radiation after its interaction with the sample 2, an objective lens 3 that is adapted to form an image of the sample plane 11 on the detector 4, and a path length modulator that is adapted to continuously vary the optical path length of the optical path 8 between the sample plane 11 and the detector 4.

9. The microscope of item 8, wherein the path length modulator has a wedge 20 that is transparent to the infrared radiation and is adapted to rotate in operation, a phase modulator 13 that is transparent to the infrared radiation and is adapted to rotate in operation and has regions with different indices of refraction n1, n2, a tilting element 23 that is transparent to the infrared radiation and is adapted to be tilted about an axis 24 in operation, a diffusing screen that is transparent to the infrared radiation and is adapted to rotate in operation, and/or a diffuser mirror that reflects the infrared radiation and is adapted to rotate in operation.

10. The microscope of item 8 or 9, wherein the path length modulator is adapted to continuously move the sample 2 and/or the detector 4 in a direction parallel to the optical axis 17 of the microscope 16 in operation.

11. The microscope of one of items 8 through 10, wherein the path length modulator is adapted to vary the optical path length of the optical path 8 between the sample plane 11 and the detector 4 a periodically, and in particular chaotically.

12. The microscope of one of items 8 through 10, wherein the path length modulator is adapted to vary the optical path length of the optical path 8 between the sample plane 11 and the detector 4 periodically.

13. The microscope of item 12, wherein the microscope 16 is equipped such that in operation the frequency at which the optical path length is varied is higher than half the readout frequency of the detector 4 or half the reciprocal integration time of the detector 4.

14. The microscope of one of items 8 to 13, wherein the path length modulator is adapted to vary the optical path length within a region that is shorter than the depth of focus of the microscope 16.

15. The microscope of one of items 8 through 14, wherein the microscope 16 is adapted to modify the infrared radiation such that the sample 2 is irradiated with pseudothermal infrared radiation.

16. The microscope of one of items 8 through 15, wherein the coherence length of the radiation source 12 is longer than the distance from the sample plane 11 to the detector 4.

17. A microscope having a radiation source 12 that is adapted to emit, during operation of the microscope 16, temporally coherent infrared radiation that propagates along an optical path 8 of the microscope 16 during operation, a sample plane 11 in which a sample 2 is to be placed during operation, a detector 4 that is adapted to detect the infrared radiation after its interaction with the sample 2, an objective lens 3 that is adapted to form an image of the sample plane 11 on the detector 4, and a mask 26 that is located in the optical path 8 between the sample plane 11 and the detector 4 and has at least one radial section in which the mask 26 has at least one mask-free region, and for each of the mask-free regions has one region apiece in which the mask 26 blocks the infrared radiation and that is arranged with inverted point symmetry about the optical axis 17 of the microscope 16 with respect to the associated mask-free region.

18. The microscope of item 17, wherein the mask 26 has, along its entire circumference in the radial section, an inverted point symmetry about the optical axis 17 of the microscope 16.

19. The microscope of item 17 or 18, wherein the radial section has at least three of the regions in which the mask 26 blocks the infrared radiation, wherein every two of the regions are separated by one of the mask-free regions that is located between the two regions in the circumferential direction.

20. The microscope of one of items 17 through 19, wherein the microscope 16 is adapted to rotate the mask 26 about the optical axis 17 in operation.

21. The microscope of item 20, wherein the microscope 16 is equipped such that in operation, the integration time of the detector 4 is longer than one mask rotation period, which is the time period that is associated with the shortest mask rotation after which the mask 26 covers the same region of the optical path 8 again, wherein the inverse of the mask rotation period corresponds in particular to an integer multiple of the readout frequency of the detector 4.

22. The microscope of item 20, wherein the microscope 16 is adapted to make an image with the detector 4 at various angular positions of the mask 26.

23. The microscope of one of items 17 through 22, wherein the mask 26 has a mirror 27 on its side facing the sample plane 11 that reflects the infrared radiation, and the radiation source 12 is adapted to deflect the infrared radiation via the mirror 27 onto the sample plane 11 so that the detector 4 is adapted to detect the infrared radiation in its diffuse reflection in operation.

24. The microscope of item 23, wherein the mask 26 is tilted relative to the optical axis 17 of the microscope 16.

25. The microscope of one of items 17 through 23, wherein the mask 26 is located in an aperture stop plane of the microscope 16.

26. The microscope of one of items 17 through 25, wherein the microscope 16 is adapted to modify the infrared radiation such that the sample 2 is irradiated with pseudothermal infrared radiation.

27. The microscope of one of items 17 through 26, wherein the coherence length of the radiation source 12 is longer than the distance from the sample plane 11 to the detector 4.

28. A microscope having a radiation source 12 that is adapted to emit, during operation of the microscope 16, temporally coherent infrared radiation that propagates along an optical path 8 of the microscope 16 during operation, a sample plane 11 in which a sample 2 is to be placed during operation, a detector 4 that is adapted to detect the infrared radiation after its interaction with the sample 2, an objective lens 3 that is adapted to form an image of the sample plane 11 on the detector 4, and a neutral-density filter 25 for the infrared radiation that is located in the optical path 8 between the sample plane 11 and the detector 4.

29. The microscope of item 28, wherein the neutral-density filter 25 is located in an aperture stop plane of the microscope 16.

30. The microscope of item 28 or 29, wherein the microscope 16 is adapted to modify the infrared radiation such that the sample 2 is irradiated with pseudothermal infrared radiation.

31. The microscope of one of items 28 through 30, wherein the coherence length of the radiation source 12 is longer than the distance from the sample plane 11 to the detector 4.

32. A microscope having a radiation source 12 that is adapted to emit, during operation of the microscope 16, temporally coherent infrared radiation that propagates along an optical path 8 of the microscope 16 during operation, a sample plane 11 in which a sample 2 is to be placed during operation, a detector 4 that is adapted to detect the infrared radiation after its interaction with the sample 2, and an objective lens 3 that is adapted to form an image of the sample plane 11 on the detector 4, wherein the radiation source 12 is adapted to vary the wavelength of the infrared radiation in operation and the detector 4 is adapted to perform an averaging over several of the wavelengths in operation.

33. The microscope of item 32, wherein the microscope 16 is adapted to perform the averaging in a spectral range in which the wavelength is varied less than 8 cm-1, in particular less than 4 cm-1, in particular less than 2 cm-1, in particular less than 1 cm-1.

34. The microscope of item 32 or 33, wherein the microscope 16 is adapted to modify the infrared radiation such that the sample 2 is irradiated with pseudothermal infrared radiation.

35. The microscope of one of items 32 through 34, wherein the coherence length of the radiation source 12 is longer than the distance from the sample plane 11 to the detector 4.

REFERENCE NUMERALS

1 sample holder
2 sample
3 objective lens
4 detector, camera
5 linear polarizing filter
6 λ/4 waveplate
7 absorber
8 optical path
9 Faraday isolator
10 isolator arrangement
11 sample plane
12 radiation source
13 phase modulator
14 axis of rotation
15 optical element
16 microscope
17 optical axis
18 phase manipulator
19 phase manipulator axis of rotation
20 wedge
21 wedge axis of rotation
22*a* first piezoelectric crystal
22*b* second piezoelectric crystal
23 tilting element
24 axis
25 neutral-density filter
26 mask
26*a* first mask
26*b* second mask
26*c* third mask
26*d* fourth mask
26*e* fifth mask
27 mirror Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A microscope comprising:
  a radiation source that emits temporally coherent infrared radiation that propagates along an optical path of the microscope during operation;
  a sample plane in which a sample is disposed during operation;
  a detector that detects the infrared radiation after the infrared radiation interacts with the sample;
  an objective lens that forms an image of the sample plane on the detector during operation; and
  an isolator arrangement disposed in the optical path between the sample plane and the detector, wherein the isolator arrangement permits the infrared radiation to travel in the optical path only in a direction towards the detector.

2. The microscope of claim 1, wherein the microscope has a linear optical axis between the sample plane and the detector along which the optical path passes, wherein the isolator arrangement includes a linear polarizing filter and a λ/4 waveplate, wherein the linear polarizing filter filters the infrared radiation and is located in the optical path between the sample plane and the detector, wherein the λ/4 waveplate is located in the optical path between the linear polarizing filter and the detector, and wherein the linear polarizing filter is oriented such that the infrared radiation is rotated by 90° after passing through the linear polarizing filter and twice passing through the λ/4 waveplate.

3. The microscope of claim 2, wherein the linear polarizing filter is tilted relative to an optical axis of the microscope.

4. The microscope of claim 2, wherein the isolator arrangement includes an absorber that absorbs the infrared radiation that is reflected from a surface of the linear polarizing filter facing the detector.

5. The microscope of claim 1, wherein the isolator arrangement includes a Faraday isolator disposed in the optical path between the sample plane and the detector.

6. A microscope comprising:
  a radiation source that emits temporally coherent infrared radiation that propagates along an optical path of the microscope during operation;
  a sample plane in which a sample is disposed during operation;
  a detector that detects the infrared radiation after the infrared radiation interacts with the sample;
  an objective lens that forms an image of the sample plane on the detector during operation; and
  an isolator arrangement disposed in the optical path between the sample plane and the detector, wherein the isolator arrangement permits the infrared radiation to travel in the optical path only in a direction towards the detector, and wherein the microscope is adapted to modify the infrared radiation such that the sample is irradiated with pseudothermal infrared radiation.

7. A microscope comprising:
a radiation source that emits temporally coherent infrared radiation that propagates along an optical path of the microscope during operation;
a sample plane in which a sample is disposed during operation;
a detector that detects the infrared radiation after the infrared radiation interacts with the sample, wherein the radiation source has a coherence length that is longer than a distance from the sample plane to the detector;
an objective lens that forms an image of the sample plane on the detector during operation; and
an isolator arrangement disposed in the optical path between the sample plane and the detector, wherein the isolator arrangement permits the infrared radiation to travel in the optical path only in a direction towards the detector.

8. A microscope comprising:
a radiation source that emits temporally coherent infrared radiation that propagates along an optical path of the microscope during operation;
a sample plane in which a sample is disposed during operation;
a detector that detects the infrared radiation after the infrared radiation interacts with the sample;
an objective lens that forms an image of the sample plane on the detector; and
a path length modulator that continuously varies an optical path length of the optical path between the sample plane and the detector.

9. The microscope of claim 8, wherein the path length modulator is taken from the group consisting of: a wedge that is transparent to the infrared radiation and that rotates during operation, a phase modulator that is transparent to the infrared radiation and that rotates during operation and that has regions with different indices of refraction, a tilting element that is transparent to the infrared radiation and that tilts about an axis during operation, a diffusing screen that is transparent to the infrared radiation and that rotates during operation, and a diffuser mirror that reflects the infrared radiation and that rotates during operation.

10. The microscope of claim 8, wherein the path length modulator continuously moves the sample and/or the detector in a direction parallel to an optical axis of the microscope during operation.

11. The microscope of claim 8, wherein the path length modulator varies the optical path length of the optical path between the sample plane and the detector aperiodically.

12. The microscope of claim 8, wherein the path length modulator varies the optical path length of the optical path between the sample plane and the detector periodically.

13. A microscope comprising:
a radiation source that emits temporally coherent infrared radiation that propagates along an optical path of the microscope during operation;
a sample plane in which a sample is disposed during operation;
a detector that detects the infrared radiation after the infrared radiation interacts with the sample;
an objective lens that forms an image of the sample plane on the detector; and
a path length modulator that continuously varies an optical path length of the optical path between the sample plane and the detector, wherein the path length modulator varies the optical path length of the optical path between the sample plane and the detector periodically, and wherein the optical path length is varied during operation at a frequency that is higher than half of a readout frequency of the detector.

14. A microscope comprising:
a radiation source that emits temporally coherent infrared radiation that propagates along an optical path of the microscope during operation;
a sample plane in which a sample is disposed during operation;
a detector that detects the infrared radiation after the infrared radiation interacts with the sample;
an objective lens that forms an image of the sample plane on the detector; and
a path length modulator that continuously varies an optical path length of the optical path between the sample plane and the detector, wherein the microscope has a depth of focus, and wherein the path length modulator varies the optical path length within a range that is shorter than the depth of focus.

15. The microscope of claim 8, wherein the microscope modifies the infrared radiation such that the sample is irradiated with pseudothermal infrared radiation.

16. The microscope of claim 8, wherein the radiation source has a coherence length that is longer than a distance from the sample plane to the detector.

17. A microscope comprising:
a radiation source that emits temporally coherent infrared radiation that propagates along an optical path of the microscope during operation;
a sample plane in which a sample is disposed during operation;
a detector that detects the infrared radiation after the infrared radiation interacts with the sample;
an objective lens that forms an image of the sample plane on the detector; and
a mask that is disposed in the optical path between the sample plane and the detector, wherein the mask has a radial mask section that blocks the infrared radiation and a radial mask-free section, and wherein the mask exhibits an inverted point symmetry about an optical axis of the microscope with respect to the radial mask section and the radial mask-free section.

18. The microscope of claim 17, wherein the mask rotates about the optical axis during operation.

19. The microscope of claim 17, wherein the mask has a mirror on a side facing the sample plane, and wherein the mirror reflects infrared radiation emitted from the radiation source onto the sample plane.

20. The microscope of claim 17, wherein the mask is located in an aperture stop plane of the microscope.

* * * * *